(12) United States Patent
Wang et al.

(10) Patent No.: US 11,369,064 B2
(45) Date of Patent: Jun. 28, 2022

(54) REGULATING SYSTEM AND METHOD FOR MULTILAYER SHADING FILM OF PLASTIC GREENHOUSE WITH ADJUSTABLE SHADING RATE

(71) Applicant: JIANGSU UNIVERSITY, Zhenjiang (CN)

(72) Inventors: Xinzhong Wang, Zhenjiang (CN); Liangliang Li, Zhenjiang (CN)

(73) Assignee: JIANGSU UNIVERSITY, Zhenjiang (CN)

( * ) Notice: Subject to any disclaimer, the term of this patent is extended or adjusted under 35 U.S.C. 154(b) by 703 days.

(21) Appl. No.: 16/332,607

(22) PCT Filed: Sep. 7, 2018

(86) PCT No.: PCT/CN2018/104540
§ 371 (c)(1),
(2) Date: Mar. 12, 2019

(87) PCT Pub. No.: WO2019/137034
PCT Pub. Date: Jul. 18, 2019

(65) Prior Publication Data
US 2021/0337743 A1 Nov. 4, 2021

(30) Foreign Application Priority Data
Jan. 15, 2018 (CN) .......................... 201810034463.8

(51) Int. Cl.
*A01G 9/14* (2006.01)
*A01G 9/24* (2006.01)
(Continued)

(52) U.S. Cl.
CPC ......... *A01G 9/1438* (2013.01); *A01G 9/1415* (2013.01); *A01G 9/246* (2013.01);
(Continued)

(58) Field of Classification Search
CPC .... A01G 9/1438; A01G 9/1469; A01G 9/246; A01G 9/26; A01G 9/225
See application file for complete search history.

(56) References Cited

U.S. PATENT DOCUMENTS 4,290,242 A 9/1981 Gregory, Jr.
2018/0303042 A1* 10/2018 Daios .................. A01G 9/1438

FOREIGN PATENT DOCUMENTS

CN 2537210 Y 2/2003
CN 204090650 U 1/2015
(Continued)

*Primary Examiner* — Timothy D Collins
*Assistant Examiner* — Madeline L Douglas
(74) *Attorney, Agent, or Firm* — Heslin Rothenberg Farley & Mesiti, P.C.

(57) ABSTRACT

The invention discloses a regulating system and method for multilayer shading film of plastic greenhouse with adjustable shading rate. The upper film of the sunshade is a fully transparent film, while the middle film and the lower film are printed with dots, which are interlaced. Through the measurement and comparison of the warm light in the greenhouse, the combined control of the sunshade film is realized. Not only can it adjust its light blocking rate, but it also has a heat insulating effect when there is a certain amount of air in the film.

12 Claims, 6 Drawing Sheets

(51) Int. Cl.
  *A01G 9/26* (2006.01)
  *F24F 11/63* (2018.01)
  *B32B 27/08* (2006.01)
  *B32B 27/32* (2006.01)
  *F24F 130/20* (2018.01)
  *F24F 110/40* (2018.01)
  *F24F 110/10* (2018.01)

(52) U.S. Cl.
  CPC ........... *A01G 9/26* (2013.01); *B32B 27/08* (2013.01); *B32B 27/32* (2013.01); *F24F 11/63* (2018.01); *B32B 2250/03* (2013.01); *B32B 2250/242* (2013.01); *B32B 2255/10* (2013.01); *B32B 2255/205* (2013.01); *B32B 2307/304* (2013.01); *B32B 2307/412* (2013.01); *B32B 2410/00* (2013.01); *F24F 2110/10* (2018.01); *F24F 2110/40* (2018.01); *F24F 2130/20* (2018.01); *Y02A 40/25* (2018.01)

(56) References Cited

FOREIGN PATENT DOCUMENTS

| | | | |
|---|---|---|---|
| CN | 105104018 A | * | 12/2015 |
| CN | 108370773 A | | 8/2018 |
| JP | 2007330121 A | | 12/2007 |

* cited by examiner

REGULATING SYSTEM AND METHOD FOR MULTILAYER SHADING FILM OF PLASTIC GREENHOUSE WITH ADJUSTABLE SHADING RATE

CROSS REFERENCE TO RELATED APPLICATIONS

This application is a U.S. National Phase filing under 35 U.S.C. § 371 of International Application PCT/CN2018/104540, filed Sep. 7, 2018. PCT/CN2018/104540 claims priority from Chinese Patent Application Number 201810034463.8, filed Jan. 15, 2018. The entire contents of each of these applications are hereby expressly incorporated herein by reference.

TECHNICAL FIELD

The proposed invention belongs to the field of facility agriculture and covers materials and intelligent agriculture control-an automatic control system for a multilayer plastic film, used in a plastic shed greenhouse, that can regulate the shading rate of the greenhouse.

BACKGROUND TECHNOLOGY

Multispan greenhouses are one of the most-used types of facility gardening. Plastic greenhouses are covered with single or multilayer shaded nets; existing shading nets mostly comprise single-layer textiles, which cannot change the shading rate. Although multilayer shading nets can adjust the shading rate, the structure of the retracting mechanism is complicated and the intelligent control cost is high. In the winter, to keep warm, it is necessary to set a heat preservation curtain inside the greenhouse. The shading rate of the heat preservation curtain cannot be adjusted, and it is difficult to adapt to the production needs. If the shading net and the thermal insulation film are laid separately, the installation of the multilayer shading net and the thermal insulation film requires a large greenhouse height space, which is not conducive to field operation.

SUMMARY OF THE INVENTION

Requirement of a large space, complexity of structure, high cost and invariable shading rate are problems of existing plastic greenhouse, the object of the present invention is to solve them. A plastic greenhouse multilayer shading film control system and its regulation method are proposed, whereby the shading rate can be adjusted and can be used for nighttime insulation in greenhouses.

To achieve the above goals, the technical scheme adopted by the multilayer solar film control system of the plastic greenhouse that is capable of adjusting the light blocking rate is as follows: include a sunshade film cover on the plastic greenhouse; install an indoor temperature sensor and an indoor light sensor in the plastic greenhouse; create a sunshade film that is composed of upper, middle, and lower films, with the upper film being fully transparent, whereas the middle and lower films are printed with dots; interlace the intermediate film and the printed dots on the underlying film to form a sealed upper air cavity between the upper and middle films, and a sealed lower air cavity between the middle and lower films; connect the upper air chamber to the upper left port of the electromagnetic reversing valve through a pipe that goes through the upper air chamber; and connect the lower air chamber to the upper right port of the electromagnetic reversing valve via a pipe through the lower air chamber. The lower left port of the electromagnetic reversing valve will sequentially connect to the second air compressor, the second one-way valve, and the outside to form an upper air chamber deflation circuit. The lower right port of the electromagnetic reversing valve will sequentially connect to the third air compressor, the third one-way valve, and the outside to form a lower air chamber deflation circuit. The lower middle port of the electromagnetic reversing valve will sequentially connect to the pressure-reducing valve, the air filter, the gas storage tank, the water dividing drain, the first check valve, and the first air compressor to form a gas circuit. A third pressure gauge will be mounted on the upper air chamber trachea and a second pressure gauge on the lower air chamber trachea. The temperature and illumination sensors in the shed, the second pressure gauge, and the third pressure gauge will, respectively, connect to the input end of the controller through a signal line. The output end of the controller will connect to the first air compressor through the first driver, connecting to the second air compressor through the second driver, connecting to the third air compressor through the third driver, and connect to the electromagnetic reversing valve through the relay.

The technical solution adopted by the method for regulating the multilayer solar film control system of the plastic greenhouse with an adjustable shading rate comprises the following steps:

A. The indoor temperature sensor (20) and the indoor light sensor (21) transmit temperature and illumination data to the controller (22), the second pressure gauge (10) and the third pressure gauge (11) respectively transmit the detected air pressure values of the lower air chamber (27) and the upper air chamber (26) to the controller (22), the controller (22) processes the temperature value T, the illumination value L, and the air pressure values $P_2$ and $P_3$;

B. When the illumination value L≥20,000 lux, the temperature value T≥35° C., and the air pressure values $P_2$ and $P_3$ detected by the second pressure gauge (10) and the third pressure gauge (11) satisfy $1<P_2 \leq 150$ Pa, $1<P_3 \leq 150$ Pa, the controller (22) powers off the relay (33), drives the second air compressor (13) to work, and extracts the gas in the upper air chamber (26), the second air compressor (13) stops working until $P_3 \leq 1$ Pa; Subsequently, the controller (22) energizes the relay (33), drives the third air compressor (15) to work, and extracts the gas in the lower air chamber (27), the third air compressor (15) stops working until $P_2 \leq 1$ Pa; The upper film (28) is attached to the upper surface of the middle film (29), and the middle film (29) is attached to the upper surface of the lower film (30). The printed area (34) of the middle film (29) coincides with the non-printed area (35) of the lower film, and the non-printed area (35) of the middle film (29) coincides with the lower film printed area (34); the sunshade film (12) has the lowest light transmittance;

C. When the illumination value L satisfies 15,000 ≤L<20,000 lux, the temperature value T satisfies 25 <T <35° C., the air pressure value detected by the third pressure gauge (11) is $P_3 \leq 150$ Pa, and the detected air pressure value $P_2$ of the second pressure gauge (10) is $P_2<100$ Pa, the controller (22) powers off the relay (33), controls the first air compressor (1) to work, and the compressed air enters the lower air chamber (27), the first air compressor (1) stops working until the air pressure value $P_2$ satisfies $100 \leq P_2 \leq 150$ Pa; At the same time, the gas inside the upper air chamber (26) is discharged to the outside, the upper film (28) is attached to the upper surface of the middle film (29), the middle film (29) and the lower film (30) are separated by gas, the printed area (34) of the middle film (29) is separated from the printed area (34) of the lower film (30), and the sunshade film (12) has the highest light transmittance;

D. When the illumination value is L <100 lux, the temperature value is T≤15° C., the air pressure value is $P_3$<100 Pa detected by the third pressure gauge (11) and the air pressure value is $P_2$<150 Pa detected by the second pressure gauge (10), the controller (22) powers off the relay (33), controls the first air compressor (1) to work, and the compressed air enters the lower air chamber (27), until the air pressure value $P_2$ satisfies 100≤$P_2$≤150 Pa, the first air compressor (1) stops working; At the same time, the gas inside the lower air chamber (27) is discharged to the outside, the middle film (29) is attached to the upper surface of the lower film (30), the middle film (29) and the upper film (30) are separated by gas, the printed area (34) of the middle film (29) coincides with the non-printed area (35) of the lower film (30), and the sunshade film (12) is insulated and inflated.

The beneficial effects of the present invention compared to the prior technology are: The invention can realize the combined regulation of the sunshade film by measuring and comparing the temperature and light of the greenhouse, whereas the movement of the sunshade film is controlled through the valve and air compressor. Compared with existing multilayer sunshade nets, the sunshade film of this invention is multipurpose; not only can it adjust the shading rate, but it also has a heat insulation effect when there is some air in the film, and can also be used to insulate the greenhouse at night. The utility model eliminates the back and forth distribution of the sunshade net and can achieve the stepless regulation of the transmittance of the sunshade film within a certain range.

Figure 1:
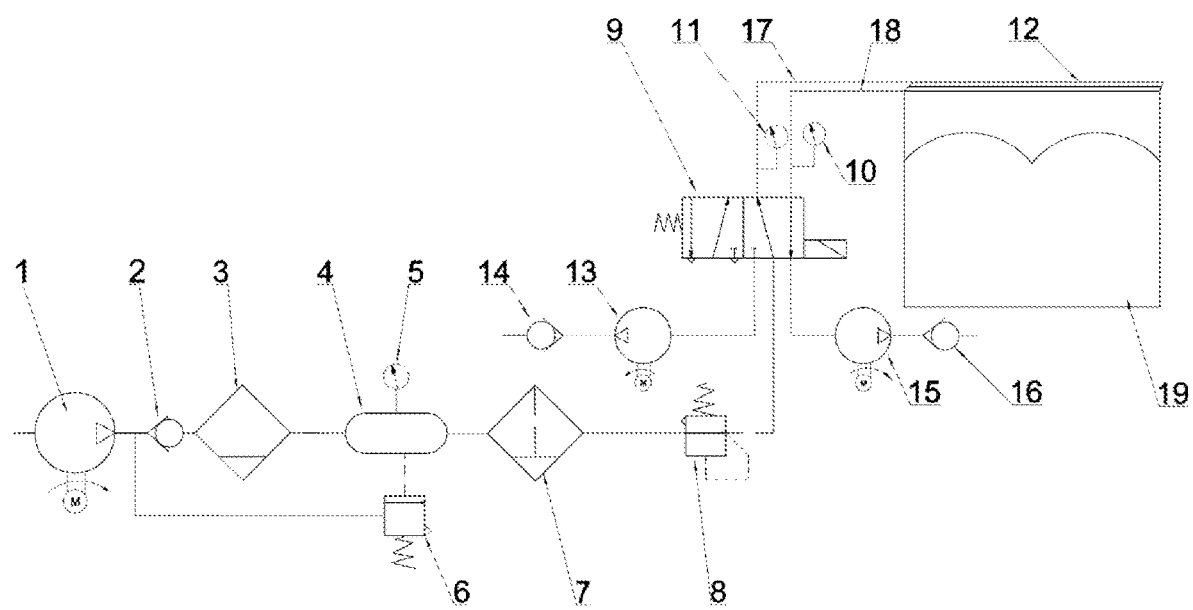
FIG. 1 shows a schematic view of the structure connection of a regulating system for multilayer shading film of plastic greenhouse with an adjustable shading rate according to the present invention.

Items in FIG. 1: (1) First air compressor; (2) First check valve; (3) Water drainer; (4) Gas tank; (5) First pressure gauge; (6) Safety valve; (7) Air filter; (8) Pressure-reducing valve; (9) Solenoid reversing valve; (10) Second pressure gauge; (11) Third pressure gauge; (12) Sunscreen; (13) Second air compressor; (14) Second check valve; (15) Third air compressor; (16) Third check valve; (17) Upper air chamber air tube; (18) Lower air chamber air tube; (19) Plastic greenhouse; (20) Indoor temperature sensor; (21) Indoor light sensor; (22) Controller; (23) First driver; (24) Second driver; (25) Third driver; (26) Upper air chamber; (27) Lower air chamber; (28) Upper film; (29) Middle film; (30) Lower film; (31) Electromagnet; (32) Value core; (33) Relay; (34) Printed area; (35) Non-printed area.

DETAILED DESCRIPTION

Figure 2:
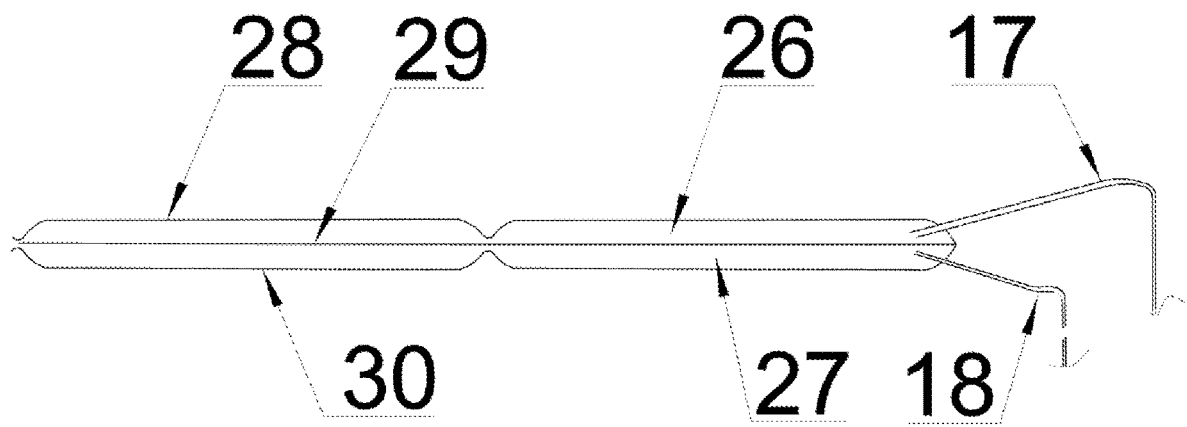
FIG. 2 shows the multilayered structure of the sunshade film in FIG. 1 and its external enlarged view.

Referring to FIGS. 1 and 2, the multilayer solar film control system of this invention has a sunshade film (12), which covers the plastic greenhouse (19). The sunshade film (12) comprises upper, middle, and lower layers; these three layers are made of a polyolefin material. The upper film (28) is a fully transparent film, the middle film (29) is a film printed with silver dots, and the lower film (30) is also printed; the dots printed on the intermediate film (29) and lower film (30) are alternately laid. The surrounding edge of the three-layer film is sealed as a whole, and the three layers are divided into upper and lower air chambers by hot pressing. A sealed upper air chamber (26) is formed between the upper film (28) and the intermediate film (29), (26) can be filled with air, and a sealed lower air chamber (27) is formed between the intermediate film (29) and the lower film (30), and the lower air chamber (27) can be filled with air.

Figure 3:
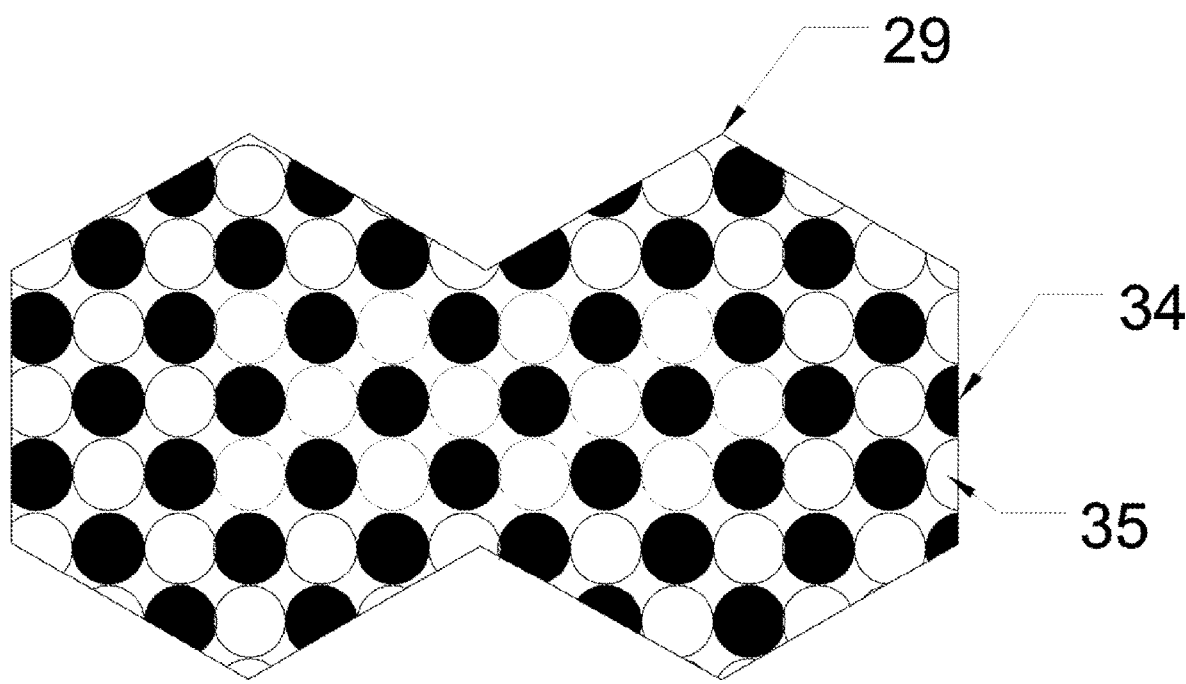
FIG. 3 presents an enlarged plan view showing a partial plan view of the intermediate film in FIG. 2.

Referring to FIGS. 2 and 3, only a partial top view of the intermediate film (29) is shown. The intermediate film (29) is joined to the upper film (28) and the lower film (30) by a hot press method using a plurality of regular polygons that are compacted and joined to each other but are not compacted at the corners. The non-compacting at the corners ensures the interconnection of the inner cavity of the regular polygon between the two films, forming the upper air chamber (26) and the lower air chamber (27). FIG. 3 is exemplified by a film having only two regular hexagonal areas. The intermediate film (29) and the lower film (30) are printed with dots, the diameters of which are 1-10 mm, or squares with a side length of 1-10 mm. The intermediate film (29) and the lower film (30) are each composed of a printed dot area (34) and a non-printed dot area (35); the printed dot area (34) comprises silver printed dots with a certain light transmittance. When only the intermediate film (29) and the lower film (30) are bonded together, the positions of the silver dots on the two films are staggered with each other; the printed areas (34) on the intermediate film (29) correspond with the non-printed areas (35) on the lower film (30), whereas the non-printed area (35) on the intermediate film (29) corresponds with the printed area (34) on the lower film (30). When the upper air chamber (26) or the lower air chamber (27) is inflated or inhaled, the position of the intermediate film (29) can be adjusted to change the degree of overlap of the printed dots on the intermediate film (29) and the lower film (30), thus adjusting the shading rate.

Referring to FIG. 1, the upper air chamber (26) and the lower air chamber (27) are respectively connected to different interfaces of the electromagnetic reversing valve (9) through corresponding air tubes, and the electromagnetic reversing valve (9) is a two-position five-way solenoid valve. The upper air chamber (26) is internally sealed and connected to one end of the upper air chamber air tube (17), whereas the lower air chamber (27) is internally sealed and connected to one end of the lower air chamber air tube (18). The upper air chamber air tube (17) extends from the upper air chamber (26) to the upper left port (A) of the electromagnetic reversing valve (9); the lower air chamber pipe (18) extends from the lower air chamber (27) to the upper right port (B) of the electromagnetic reversing valve (9). A third pressure gauge (11) is mounted on the upper air chamber trachea (17), and a second pressure gauge (10) is mounted on the lower air chamber trachea (18); the second pressure gauge (10) and the third pressure gauge (11) respectively detect the lower air chamber (27) and the upper air chamber (26) air pressure value. The lower left port (O1) of the electromagnetic reversing valve (9) is connected to the inlet of the second air compressor (13) via a pipe, and the outlet of the second air compressor (13) is connected to the second check valve (14) via a pipe, while the second check valve (14) is connected to the outside. The lower right port (O2) of the electromagnetic reversing valve (9) is connected to the inlet of the third air compressor (15) via a pipe, while the outlet of the third air compressor (15) is connected to the third check valve (16) via a pipe; the third check valve (16) is connected to the outside. The lower intermediate port (P) of the electromagnetic reversing valve (9) is connected to the outlet of the pressure-reducing valve (8) via a pipe. The inlet of the pressure-reducing valve (8) is connected in series with the air filter (7), the gas storage tank (4), the water dividing and draining device (3), and the first one-way valve (2) and first air compressor (1). The air tank (4) is provided with a first pressure gauge (5) and a safety valve (6), and the safety valve (6) is connected to the air tank (4) through an electric signal line. Therefore, the upper air chamber (26), the upper air chamber air tube (17), the electromagnetic reversing valve (9), the second air compressor (13), and the second check valve (14), that are sequentially connected, constitute an upper air chamber deflation circuit. The lower air chamber (27), the lower air chamber air tube (18), the electromagnetic reversing valve (9), the third air compressor (15), and the third one-way valve (16) are sequentially connected to form a lower air chamber deflation circuit; the electromagnetic reversing valve (9) is connected in sequence. The pressure-reducing valve (8), the air filter (7), the gas storage tank (4), the water dividing drain (3), the first check valve (2), and the first air compressor (1) constitute an inflation circuit.

Figure 4:
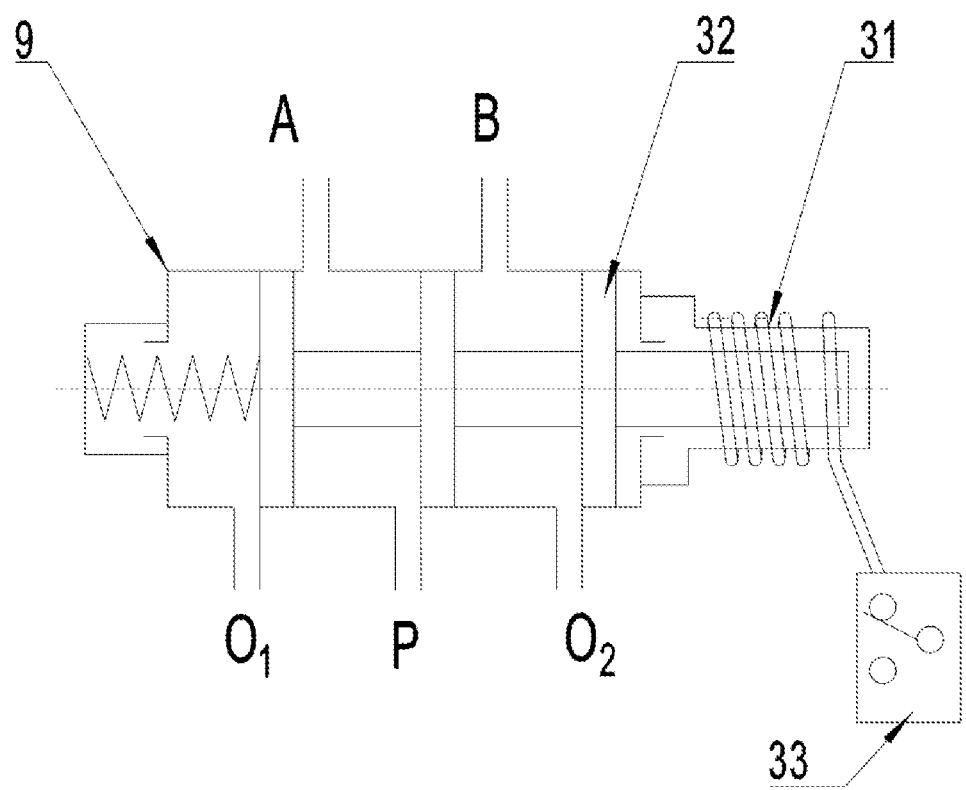
FIG. 4 presents an enlarged plan view showing the structure of the value core of the solenoid reversing valve (9) on the rightmost side in FIG. 1.

Referring to FIG. 4, the electromagnetic reversing valve (9) has a valve body (33) and an electromagnet (31). The electromagnet (31) is on the right side of the valve body (33); a coil is wound around the electromagnet (31) and is connected to the relay (33). When the relay (33) is energized, the electromagnet (31) attracts the value core (32), moving the value core (32) to the right. At this time, the upper right port (B) of the electromagnetic reversing valve (9) communicates with the lower right port (O2); the upper right port (B), the lower intermediate port (P), and the lower left port (O1) are not connected; the upper left port (A) and the lower side of the intermediate port (P) of the electromagnetic reversing valve (9) are connected. The upper left interface (A) is not connected to the lower left port (O1) or the lower right port (O2).

Figure 5:
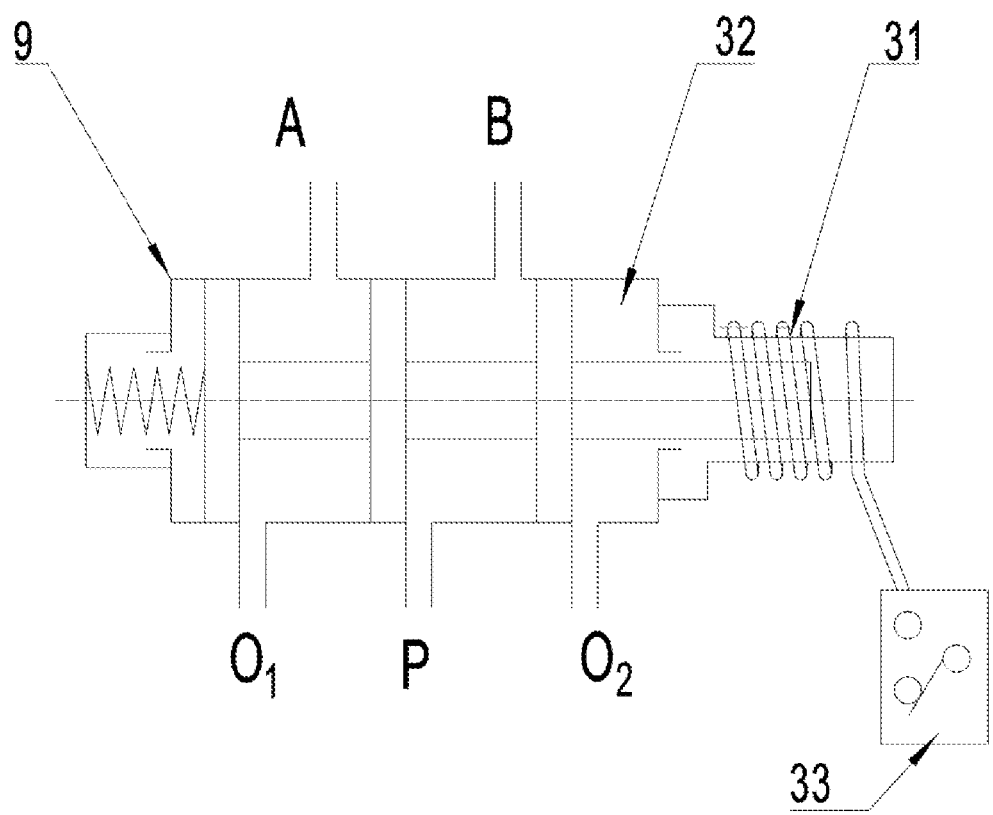
FIG. 5 presents an enlarged plan view showing the valve body of the solenoid reversing valve (9) on the leftmost side in FIG. 1.

Referring to FIG. 5, when the relay (33) is powered off, the electromagnet (31) releases the value core (32), and the value core (32) returns to the left side. At this time, the upper left port (A) of the electromagnetic reversing valve (9) communicates with the lower left port (O1), and the upper left port (A) will not be connected to the intermediate port (P) or the lower right port (O2); The upper right port (B) of the electromagnetic reversing valve (9) communicates with the lower intermediate port (P), and the upper interface (B) does not communicate with the lower right port (O2) or the lower left port (O1).

Figure 6:
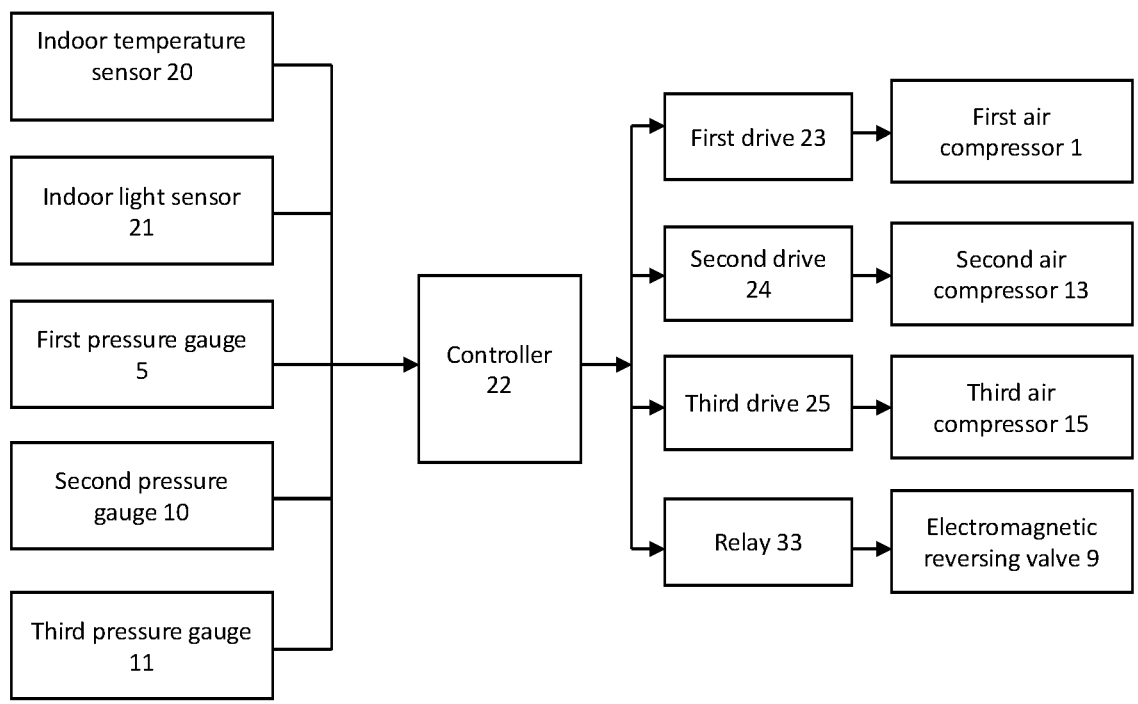
FIG. 6 shows a control block diagram of the invention.

Referring to FIGS. 1 and 6, the in-shed temperature sensor (20) and the in-shed light sensor (21) are fixed to the skeleton inside the plastic greenhouse (19). The indoor temperature sensor (20), the indoor light sensor (21), the first pressure gauge (5), the second pressure gauge (10), and the third pressure gauge (11) are respectively connected to the input end of the controller (22) via signal lines, and the output ends of the controller (22) are respectively connected to the input end of the first driver (23), the second driver (24) and the third driver (25); the output end of the first driver (23) is connected to the first air compressor (1), and the output end of the second driver (24) is connected to the second air compressor (13). The output of the third driver (25) is connected to the third air compressor (15) to operate the air compressor. The output end of the controller (22) is connected to the relay (33) via a signal line, and the output end of the relay (33) is connected to the electromagnetic reversing valve (9) to control the commutation of the electromagnetic reversing valve (9).

Referring to FIGS. 1-6, when the multilayer solar film control system of the present invention is in operation, the gas chamber (26) is inflated through the gas-filling circuit, and the gas in the lower gas chamber (27) is discharged through the lower gas chamber deflation circuit, so that the middle film (29) is pressed downward against the lower-layer membrane (28), inflating the air chamber (27) through the inflation circuit, and discharges the gas in the upper air chamber (26) through the upper air chamber deflation circuit, so that the middle layer film (29) is pressed upward against the upper layer film (28), further adjusting the position of the middle film (29) to achieve the purpose of shading or heat preservation. The gas in the upper air chamber (26) and the lower air chamber (27) is sucked out through the upper air chamber deflation circuit and the lower air chamber deflation circuit, so that the three layers of film are closely adhered together to achieve the purpose of a high shading rate, details as follows:

The indoor temperature sensor (20) and the indoor light sensor (21) collect the temperature and illumination data inside the plastic greenhouse (19) by a set time Td, Td=20 min. Td is the time period during which the controller (22) presets the shading condition data collection. The temperature and illumination data are transmitted to the controller (22), while the second pressure gauge (10) and the third pressure gauge (11) respectively transmit the detected air pressure values of the lower air chamber (27) and the upper air chamber (26) to the controller (22). The controller (22) processes the temperature and illumination data, and the air pressure value.

When the illumination value L satisfies $L \geq L_O$, where $L_O$ is the preset illumination value of the controller (22) equal to 20,000 lux, and when the temperature value T satisfies $T \geq T_O$, where $T_O$ is the preset temperature value of the controller (22) equal to 35° C., the air pressure value $P_2$ detected by the second pressure gauge (10) satisfies $P_N < P_2 \leq P_{max}$, and the air pressure value $P_3$ detected by the third pressure gauge (11) satisfies $P_N < P_3 \leq P_{max}$, where $P_N$ is preset in the controller (22) and is the pressure value in the upper air chamber (26) and the lower air chamber (27) when the three layers of film are clung to each other by the action of gravity before the sunshade film (12) is inflated, $P_N=1$ Pa; $P_{max}$ is the maximum working pressure value of the upper air chamber (26) and the lower air chamber (27), $P_{max}=150$ Pa, then: the illumination is relatively strong; the temperature is relatively high; the air pressures of the upper air chamber (26) and the lower air chamber (27) are relatively high; the controller (22) sends a signal to power off the relay (33); the coil on the electromagnet (31) is powered off; the electromagnet (31) releases the value core (32); the value core (32) moves to the left side, as shown in FIG. 5; the upper left port (A) of the electromagnetic reversing valve (9) communicates with the lower left port ($O_1$); the upper left port (A), the lower intermediate port (P), and the lower right port ($O_1$) are not connected; and the upper air chamber air tube (17) and the second air compressor (13) are connected. At the same time, the controller (22) sends a signal to the second driver (24) to drive the second air compressor (13), which draws out the gas in the upper air chamber (26). During the gas extraction in the upper air chamber (26), the air pressure in the upper air chamber (26) gradually decreases; and when the air pressure value $P_3$ in the upper air chamber (26) detected by the third pressure gauge (11) is decreased to satisfy $P_3 \leq P_N$, the controller (22) stops the second driver (24), causing the second air compressor (13) to stop working. Then, the controller (22) sends a signal that energizes the relay (33), and the value core (32) moves to the right side. As shown in FIG. 4, the upper right interface (B) and the lower middle portion are connected. The port (P) and the lower left port ($O_1$) are both disconnected, the lower air chamber gas pipe (18) and the third air compressor (15) are in communication, the controller (22) outputs a signal to the third driver (25) to operate the third air compressor (15), and the third air compressor (15) extracts the gas in the lower air chamber (27). During the gas extraction in the lower air chamber (27), the air pressure in the lower air chamber (27) gradually decreases. When the air pressure value $P_2$ in the lower air chamber (27), detected by the second pressure gauge (10), is decreased to satisfy $P_2 \leq P_N$, the controller (22) stops the third driver (25), and the third air compressor (15) stops operating. Simultaneously, the upper film (28) attaches to the upper surface of the intermediate film (29), and the intermediate film (29) attaches to the upper surface of the lower film (30). As the printed region (34) of the intermediate film (29) coincides with the underlying film non-printed region (35), the intermediate film (29) is not printed. The dotted area (35) coincides with the lower film stamping area (34), and the light transmittance of the sunshade film (12) is lowest, so the sunshade film (12) is in a high-shading-rate shade state.

When the illumination value L satisfies $L \geq L_O$ and the temperature T satisfies $T \geq T_O$, the air pressure value $P_2$ detected by the second pressure gauge (10) satisfies $P_N < P_2 \leq P_{max}$, and the air pressure value $P_3$ detected by the third pressure gauge (11) satisfies $P_3 \leq P_N$; that is, when the light is relatively strong, the temperature is relatively high, the air pressure in the upper air chamber (26) is relatively low, the upper film (28) is attached to the upper surface of the middle film (29), and the air pressure in the lower air chamber (27) is relatively high, then the controller (22) sends a signal that energizes the relay (33) and the electromagnet pulls the value core (32) to the right side. As shown in FIG. 4, the upper right port (B) of the electromagnetic reversing valve (9) is connected to the lower left port ($O_2$), while the upper right interface (B) is not connected to the lower intermediate port (P) or the lower left port ($O_1$), so that the lower air chamber air pipe (18) and the third air compressor (15) are in communication. Meanwhile, the controller (22) sends a signal to the third driver (25) to operate the third air compressor (15) which draws out the gas in the lower air chamber (27). During the gas extraction in the lower air chamber (27), the air pressure in the lower air chamber (27) gradually decreases until the air pressure value $P_2$ of the lower air chamber (27) detected by the second pressure gauge (10) is decreased to satisfy $P_2 \leq P_N$, and the controller (22) sends a signal that stops the third actuator (25), and the third air compressor (15) is stopped. At this time, the upper film (28) attaches to the upper surface of the intermediate film (29), and the intermediate film (29) attaches to the upper surface of the film (30). Because the printed area (34) of the intermediate film (29) coincides with the lower film non-printed area (35), the non-printed area (35) of the middle film (29) and the lower film printed area (34) coincide, and the light transmittance of the sunshade film (12) is the lowest, so the sunshade film (12) is in a high-shading-rate shade state.

When the illumination value L satisfies $L \geq L_0$ and the temperature T satisfies $T \geq T_O$, but the air pressure value $P_3$ detected by the third pressure gauge (11) satisfies $P_N < P_3 \leq P_{max}$, and the air pressure value $P_2$ detected by the second pressure gauge (10) satisfies $P_2 \leq P_N$, then the light is relatively strong, the temperature is relatively high, the air pressure in the upper air chamber (26) is relatively high, and the air pressure in the lower air chamber (27) is relatively low; the middle film (29) attaches to the upper surface of the lower film (30), the controller (22) sends a signal to power off the relay (33), and the value core (32) moves to the left side, as shown in FIG. 5, the upper left port (A) and the lower left port ($O_1$) of the electromagnetic reversing valve (9) are connected, the upper left interface (A) is not connected to the lower intermediate port (P) or the lower right port ($O_1$), and the upper air chamber air pipe (17) and the second air compressor (13) are in communication. Meanwhile, the controller (22) sends a signal to the second air compressor (13) to extract the gas from the upper air chamber (26). During the gas extraction in the upper air chamber (26), the air pressure in the upper air chamber (26) gradually decreases until the third pressure gauge (11) detects that the air pressure value $P_3$ in the upper air chamber (26) is reduced to satisfy $P_3 \leq P_N$, the second drive (24) is controlled to stop, and the second air compressor (13) is stopped. At this time, the upper film (28) attaches to the upper surface of the intermediate film (29), and the intermediate film (29) attaches to the upper surface of the lower film (30). As the printed area (34) of the intermediate film (29) coincides with the non-printed area (35) of the lower film (30), the non-printed area (35) of the middle film (29) coincides with the printed area (34) of the lower film (30), and the light transmittance of the sunshade film (12) is the lowest. Therefore, the sunshade film (12) is in a high-shading-rate shade state.

When the illumination value L satisfies $L \geq L_O$, the temperature T satisfies $T > T_O$, the air pressure value $P_2$ of the lower air chamber (27) detected by the second pressure gauge (10) satisfies $P_2 \leq P_N$, the air pressure value $P_3$ of the upper air chamber (26) detected by the third pressure gauge (11) satisfies $P_3 \leq P_N$, that is, the light is relatively strong, the temperature is relatively high, and the air pressure in the upper air chamber (26) and the lower air chamber (27) is low, the controller (22) shields the received light temperature signal, at which time the upper film (28) attaches to the upper surface of the intermediate film (29), and the intermediate film (29) attaches to the upper surface of the lower film (30), because the printed area (34) of the intermediate film (29) coincides with the underlying film (30) non-printed dot areas (35), the non-printed area (35) of the middle film (29) coincides with the printed area (34) of the lower film (30), and the light transmittance of the sunshade film (12) is the lowest, the sunshade film (12) is in a high-light-shielding state.

When the illumination value L satisfies $L_1 \leq L < L_O$, where $L_1$ is the illumination value preset by the controller (22) equal to 15,000 lux, $L_O = 20,000$ lux, the temperature value T satisfies $T_1 \leq T < T_O$, where $T_1 = 25°$ C. is the controller (22) preset temperature value and $T_O = 35°$ C., that is, the light is relatively low, the temperature is relatively low, and the air pressure value $P_3$ of the upper air chamber (26) detected by the third pressure gauge (11) satisfies $P_3 \leq P_{max}$ where $P_{max} = 150$ Pa, and the air pressure value $P_2$ of the lower air chamber (27) detected by the second pressure gauge (10) satisfies $P_2 < P_m$ where $P_m = 100$ Pa is the pressure value of the intermediate film (29) and the upper film (28) or the lower film (30) joined together by the air pressure, then the controller (22) sends a signal to power off the relay (33) of the solenoid valve (9), the electromagnet (31) releases the value core (32), and the value core (32) moves to the left side, as shown in FIG. 5, the lower intermediate interface (P) of the electromagnetic reversing valve (9) and the upper right port (B) are connected, the upper left interface (A) is connected to the lower left port ($O_1$), while the upper left interface (A) is not connected to the lower intermediate port (P) or the lower right port ($O_2$), and the upper air chamber air pipe (17) sequentially passes through the upper left port (A) of the electromagnetic reversing valve (9), the lower left port ($O_1$), the second air compressor (13), and the second check valve (14) communicate with the outside; the lower chamber air tube (18) sequentially passes through the upper right port (B) of the electromagnetic reversing valve (9), the lower intermediate port (P) of the pressure-reducing valve (8), the air filter (7), the gas storage tank (4), the water dividing drain (3), the first check valve (2), and the first air compressor (1) are connected; at the same time, the controller (22) sends a signal to the first driver (23) to operate the first air compressor (1), and the compressed air enters the lower air chamber (27). During the gas inflation process in the lower air chamber (27), the air pressure in the lower air chamber (27) is gradually increased, causing the middle film (29) to press up the gas inside the upper air chamber (26), so that the gas inside the upper air chamber (26) passes through the upper air chamber (17) to the outside, the air pressure in the upper air chamber (26) is gradually reduced until the upper film (28) is in close contact with the upper surface of the intermediate film (29). When the air pressure in the lower air chamber (27) is gradually increased until the air pressure $P_2$ detected by the second pressure gauge (10) satisfies $P_m \leq P_2 \leq P_{max}$, where $P_{max}$=150 Pa, the output signal of the controller (22) stops the first driver (23), and the first air pressure machine (1) stops working. At this time, the upper film (28) is in close contact with the upper surface of the intermediate film (29), while the intermediate film (29) and the lower film (30) are separated by a certain gas, and the printed area (34) of the intermediate film (29) and the printed area (34) of the lower film (30) are separated, then the light transmittance of the sunshade film (12) is high, so the sunshade film (12) is in a low-light-shielding state.

When the illumination value L satisfies $L_1 \leq L < L_O$, and the temperature value T satisfies $T_1 \leq T < T_O$, the illumination is low and the temperature is low, and when the pressure value $P_2$ detected by the second pressure gauge (10) satisfies $P_m \leq P_2 \leq P_{max}$, the controller (22) shields the received light temperature signal, the upper film (28) is in close contact with the upper surface of the intermediate film (29), the middle film (29) and the lower film (30) are separated by a certain gas, and the printed area (34) of the intermediate film (29) and the printed area (34) of the lower film (30) are separated. Therefore, the light transmittance of the sunshade film (12) is the highest, so the sunshade film is in a low-light-shielding state.

When used for nighttime heat preservation, the indoor temperature sensor (20) and the indoor light sensor (21) collect the temperature and illumination data inside the plastic greenhouse (19) at intervals of $T_n$, where $T_n$=1 h and is the data collection time of the controller (22) preset insulation condition cycle; the temperature and illumination data are transmitted to the controller (22), and the second pressure gauge (10) and the third pressure gauge (11) transmit the detected air pressure values of the lower air chamber (27) and the upper air chamber (26) to the controller (22). The controller (22) processes the temperature and illumination data, and the air pressure value.

When the illumination value L satisfies $L \leq L_2$ and the temperature value T satisfies $T \leq T_2$, where $L_2$=100 lux is the preset illumination value of the controller (22), and $T_2$=15° C. is the preset temperature value of the controller (22), and when the air pressure value $P_3$ of the three pressure gauge (11) satisfies $P_3 < P_m$, and the air pressure value $P_2$ of the second pressure gauge (10) satisfies $P_2 \leq P_{max}$, the controller (22) issues a signal to energize the relay (33), and the value core (32) moves to the right side. As shown in FIG. 4, the lower intermediate interface (P) of the electromagnetic reversing valve (9) connects to the upper left interface (A), the lower interface (P) is not in communication with the upper right interface (B), and the upper chamber air tube (17) sequentially passes through the upper left interface of the electromagnetic reversing valve (9), the lower intermediate port (P), the pressure-reducing valve (8), the air filter (7), the gas storage tank (4), the water dividing drain (3), the first check valve (2) and the first air compressor (1); the upper right port (B) of the electromagnetic reversing valve (9) is in communication with the lower left port ($O_2$), and the upper right port (B) is not in communication with the lower intermediate port (P) or the lower left port ($O_1$), so the lower air chamber air pipe (18) passes through the upper right port (B) of the electromagnetic reversing valve (9), the lower left port ($O_2$), the third air compressor (15), and the third check valve (16) are in communication with the outside; at the same time, the controller (22) sends a signal to the first driver (23) to operate the first air compressor (1), and the compressed air enters the upper air chamber (26). During the gas inflation in the upper air chamber (26), the air pressure in the upper air chamber (26) gradually increases, so that the middle film (29) is pressed downward into the gas inside the lower air chamber (27), and the gas inside the lower air chamber (27) passes through the lower air chamber (18) rows to the outside. When the third pressure gauge (11) detects that the air pressure value $P_3$ in the upper air chamber (26) satisfies $P_m \leq P_3 \leq P_{max}$, the controller (22) outputs a signal to stop the first driver (23), and the first air compressor (1) stops operating. Meanwhile, the intermediate film (29) and the upper surface of the lower film (30) are in close contact with each other. As the middle film (29) and the upper film (30) have a certain gas, the heat insulating effect is obtained, and the printed area (34) of the middle film (29) coincides with the non-printed area (35) of the lower film (30), and the light transmittance is low, which can effectively reduce the radiation loss of the greenhouse. Therefore, the sunshade film (12) is in a heat-insulated state.

When the illumination value L satisfies $L \leq L_2$ and the temperature value T satisfies $T \leq T_2$, where $L_2$=100 lux and $T_2$=15° C., and the air pressure value $P_3$ detected by the third pressure gauge (11) satisfies $P_m \leq P_3 \leq P_{max}$, the controller (22) shields the received light temperature signal, and the middle film (29) is in close contact with the upper surface of the lower film (30). As there is a certain gas between the middle film (29) and the upper film (30), the heat insulation effect is obtained; moreover, the printed area (34) of the middle film (29) coincides with the non-printed area (35) of the lower film (30), which can effectively reduce the radiation loss of the greenhouse, so the sunshade film (12) is in a heat-insulated state.

In the plastic greenhouse (19), when the measured value L of the illumination sensor (21) in the shed and the measured value T of the temperature sensor (20) in the shed satisfy the remaining conditions, for example: $L \geq L_O$ ($L \geq 20,000$ lux) and $T < T_0$ ($T < 35°$ C.), $L < L_0$ (20,000 lux) and $T \geq T_0$ (35° C.), $L < L_1$ (L<15,000 lux) and $T_1 \leq T < T_0$ ($25 \leq T < 35°$ C.), $L \geq 0$ and $T_2 < T < T_1$ ($15 < T < 25°$ C.) or $L_2 < L < L_O$ ($100 < L < 20,$ 000 lux) and T≤T$_2$ (T≤15° C.). Under any of these conditions, the sunshade film (12) is in a high-light-shielding state and is stowed.

The present invention also provides a protection circuit for the sunshade film (12). After the first air compressor (1) is started, the compressed air is supplied to the gasholder (4) via the first check valve (2) and the water dividing drain (3). The air pressure in the gasholder (4) rises. When the pressure value P$_1$ of the first pressure gauge (5) equals P$_L$, where P$_L$=160 Pa is the maximum working air pressure value of the gasholder (4), the controller (22) outputs a signal to control the first driver (23) to stop, and the first air compressor (1) stops. When the first air compressor (1) stops working, the pressure in the gasholder (4) drops. When the pressure value of the first pressure gauge (5) is P$_1$=P$_i$, where P$_i$=10 Pa supplements the leaking gas in the pipeline, and to ensure that the gasholder (4) has a minimum working gas pressure value of a certain gas, the controller (22) sends a signal to the first driver (23) to operate the first air compressor (1), and the compressed air supplies air to the gasholder (4).

The invention claimed is:

1. A regulating system for multilayer shading film of a plastic greenhouse with an adjustable shading rate, that comprises a sunshade film covering a plastic shed, the plastic shed having an indoor temperature sensor and an indoor light sensor, wherein the sunshade film comprises upper, middle, and lower layers of film, whereby
a sealed upper air chamber is formed between the upper film and the middle film, and a sealed lower air chamber is formed between the middle film and the lower film, wherein the upper film is a fully transparent film, and the middle film and the lower film are printed with dots; and
wherein upper air chamber is connected to an upper left interface of an electromagnetic reversal valve through an upper air chamber trachea, while the lower air chamber is connected to an upper right interface of the electromagnetic reversal valve through a lower air chamber trachea,
and wherein a lower left port of the electromagnetic reversal valve respectively connects a second air compressor, a second check valve, and the outside to form an upper air chamber deflation circuit; a lower right port of the electromagnetic reversal valve respectively connects a third air compressor, a third check valve, and the outside to form a lower air chamber deflation circuit; a lower middle port of the electromagnetic reversal valve respectively connects a pressure-reducing valve, an air filter, a gas shortage tank a water diversion drainer, a first check valve, and a first air compressor to constitute an inflation circuit;
and wherein a third pressure gauge is mounted on the upper air chamber trachea, and a second pressure gauge is mounted on the lower air chamber trachea;
and the indoor temperature sensor, the indoor light sensor, the second pressure gauge, and the third pressure gauge are respectively connected to an input end of a controller via a signal line, an output end of the controller is connected to the first air compressor via a first driver, to the second air compressor via a second driver, to the third air compressor via a third driver, and to the electromagnetic reversal valve via a relay.

2. A regulating system for multilayer shading film of a plastic greenhouse with an adjustable shading rate, according to claim 1, wherein the middle film and the lower film are formed by connecting a plurality of regular polygons to each other, and are hot pressed at the corners of the mutually connected regular polygons but are not compacted;
the printed dots on the middle film and the lower film are silver dots with light transmittance,
and the printed area on the middle film corresponds to the non-printed area on the lower film, and the non-printed area on the middle film corresponds to the printed area on the lower film.

3. A system for regulating a multilayer shading film of a plastic greenhouse according to claim 1, wherein:
the indoor temperature sensor and the indoor light sensor transmit temperature and illumination data to the controller, the second pressure gauge and the third pressure gauge respectively transmit the detected air pressure values of the lower air chamber and the upper air chamber to the controller, the controller processes the temperature value T, the illumination value L, and the air pressure values P$_2$, P$_3$; and
when the illumination value L>20,000 lux, the temperature value T>35° C., the air pressure values P$_2$ and P$_3$ detected by the second pressure gauge and the third pressure gauge satisfy 1<P$_2$<150 Pa, 1<P$_3$<150 Pa, the controller powers off the relay, drives the second air compressor to work, and extracts the gas from the upper air chamber, while the second air compressor stops working until P$_3$<1 Pa, and wherein, the controller energizes the relay, drives the third air compressor to work, and extracts the gas from the lower air chamber, the third air compressor stops working until P$_2$<1 Pa, and wherein the upper film attaches to the upper surface of the middle film, and the middle film attaches to the upper surface of the lower film, and wherein the printed area of the middle film coincides with the non-printed area of the lower film, and the non-printed area of the middle film coincides with the lower film printed area, such that the dots on the middle film and the lower film are interlaced, and the sunshade film has the lowest light transmittance;
and wherein, when the illumination value L satisfies 15,000<L<20,000 lux, the temperature value T satisfies 25<T<35° C., the air pressure value detected by the third pressure gauge is P$_3$<150 Pa, and the detected air pressure value P$_2$ of the second pressure gauge is P$_2$<100 Pa, the controller powers off the relay, controls the first air compressor to work, and the compressed air enters the lower air chamber, the first air compressor stops working until the air pressure value P$_2$ satisfies 100<P$_2$<150 Pa; whereby at the same time, the gas inside the upper air chamber is discharged to the outside, the upper film attaches to the upper surface of the middle film, the middle film and the lower film are separated by gas, the printed area of the middle film is separated from the printed area of the lower film, and the sunshade film has the highest light transmittance;
and wherein, when the illumination value L<100 lux and the temperature value T<15° C., the air pressure value P$_3$<100 Pa detected by the third pressure gauge and the air pressure value P$_2$<150 Pa detected by the second pressure gauge, the controller powers off the relay, controls the first air compressor to work, and the compressed air enters the lower air chamber, until the air pressure value P$_2$ satisfies 100<P$_2$<150 Pa, and the first air compressor stops working; whereby at the same time, the gas inside the lower air chamber is discharged to the outside, the middle film attaches to the upper surface of the lower film, the middle film and the upper film are separated by gas, the printed area of the middle film coincides with the non-printed area of the lower film, such that the dots on the middle film and the lower film are interlaced, and the sunshade film is insulated and inflated.

4. The system of regulation according to claim 3, wherein when the air pressure value $P_2$ detected by the second pressure gauge satisfies $P_2<1$ Pa, and the air pressure value $P_3$ detected by the third pressure gauge satisfies $P_3<1$ Pa, the controller shields the received light temperature signal and the shading film has the lowest light transmittance.

5. The system of regulation according to claim 3, wherein when the air pressure value $P_2$ detected by the second pressure gauge satisfies $100<P_2<100$ Pa, the controller shields the light temperature signal, and the light transmittance of the sunshade film is the highest.

6. The system of regulation according to claim 3, wherein when the air pressure value $P_3$ detected by the third pressure gauge satisfies $100<P_3<100$ Pa, the controller shields the received light temperature signal, and the sunshade film is insulated and inflated.

7. The system of regulation according to claim 3, wherein first pressure gauge is mounted on the gas storage tank, and the first pressure gauge is connected to the input end of the controller via a signal line, and
  a. when the pressure value of the first pressure gauge is equal to the maximum working air pressure value of the gas storage tank, the controller stops operation of the first air compressor; and
  b. when the pressure value of the first pressure gauge is equal to the minimum working air pressure value of the gas storage tank, the controller signals the first air compressor to operate.

8. A regulating method for multilayer shading film of a_plastic greenhouse with an adjustable shading rate having a sunshade film covering a plastic shed, the plastic shed having an indoor temperature sensor and an indoor light sensor, wherein the sunshade film comprises upper, middle, and lower layers of film, whereby
  a sealed upper air chamber is formed between the upper film and the middle film, and a sealed lower air chamber is formed between the middle film and the lower film, wherein the upper film is a fully transparent film, and the middle film and the lower film are printed with dots; and
  wherein the upper air chamber is connected to an upper left interface of an electromagnetic reversal valve through an upper air chamber trachea, while the lower air chamber is connected to an upper right interface of the electromagnetic reversal valve through a lower air chamber trachea,
  and wherein a lower left port of the electromagnetic reversal valve respectively connects the second air compressor, a second check valve, and the outside to form an upper air chamber deflation circuit; a lower right port of the electromagnetic reversal valve respectively connects a third air compressor, a third check valve, and the outside to form a lower air chamber deflation circuit; a lower middle port of the electromagnetic reversal valve respectively connects a pressure-reducing valve, an air filter, a gas storage tank, a water diversion drainer, a first check valve, and a first air compressor to constitute an inflation circuit;
  and a third pressure gauge is mounted on the upper air chamber trachea, and a second pressure gauge is mounted on the lower air chamber trachea;
  and the indoor temperature sensor, the indoor light sensor, the second pressure gauge, and the third pressure gauge are respectively connected to an input end of a controller via a signal line, an output end of the controller is connected to the first air compressor via a first driver, to the second air compressor via a second driver, to the third air compressor via a third driver, and to the electromagnetic reversal valve via a relay, comprising the following steps:
  A. The indoor temperature sensor and the indoor light sensor transmit temperature and illumination data to the controller, the second pressure gauge and the third pressure gauge respectively transmit the detected air pressure values of the lower air chamber and the upper air chamber to the controller, the controller processes the temperature value T, the illumination value L, and the air pressure values $P_2$, $P_3$;
  B. When the illumination value L>20,000 lux, the temperature value T>35° C., the air pressure values $P_2$ and $P_3$ detected by the second pressure gauge and the third pressure gauge satisfy $1<P_2<150$ Pa, $1<P_3<150$ Pa, the controller powers off the relay, drives the second air compressor to work, and extracts the gas from the upper air chamber, while the second air compressor stops working until $P_3<1$ Pa, and wherein, the controller energizes the relay, drives the third air compressor to work, and extracts the gas from the lower air chamber, the third air compressor stops working until $P_2<1$ Pa, and wherein the upper film attaches to the upper surface of the middle film, and the middle film attaches to the upper surface of the lower film, and wherein the printed area of the middle film coincides with the non-printed area of the lower film, and the non-printed area of the middle film coincides with the lower film printed area, such that the dots on the middle film and the lower film are interlaced, and the sunshade film has the lowest light transmittance;
are
  C. When the illumination value L satisfies $15,000<L<20,000$ lux, the temperature value T satisfies $25<T<35°$ C., the air pressure value detected by the third pressure gauge is $P_3<150$ Pa, and the detected air pressure value $P_2$ of the second pressure gauge is $P_2<100$ Pa, the controller powers off the relay, controls the first air compressor to work, and the compressed air enters the lower air chamber, the first air compressor stops working until the air pressure value $P_2$ satisfies $100<P_2<150$ Pa; whereby at the same time, the gas inside the upper air chamber is discharged to the outside, the upper film attaches to the upper surface of the middle film, the middle film and the lower film are separated by gas, the printed area of the middle film is separated from the printed area of the lower film, such that the sunshade film has the highest light transmittance;
  D. When the illumination value L<100 lux and the temperature value T<15° C., the air pressure value $P_3<100$ Pa detected by the third pressure gauge and the air pressure value $P_2<150$ Pa detected by the second pressure gauge, the controller powers off the relay, controls the first air compressor to work, and the compressed air enters the lower air chamber, until the air pressure value $P_2$ satisfies $100<P_2<150$ Pa, and the first air compressor stops working; whereby at the same time, the gas inside the lower air chamber is discharged to the outside, the middle film attaches to the upper surface of the lower film, the middle film and the upper film are separated by gas, the printed area of the middle film coincides with the non-printed area of the lower film, such that the dots on the middle film and the lower film are interlaced, and the sunshade film is insulated and inflated.

9. The method of regulation according to claim 8, wherein in Step B when the air pressure value $P_2$ detected by the second pressure gauge satisfies $P_2<1$ Pa, and the air pressure value $P_3$ detected by the third pressure gauge satisfies $P_3<1$ Pa, the controller shields the received light temperature signal and the shading film has the lowest light transmittance.

10. The method of regulation according to claim 8, wherein in Step C when the air pressure value $P_2$ detected by the second pressure gauge satisfies $100<P_2<100$ Pa, the controller shields the light temperature signal, and the light transmittance of the sunshade film is the highest.

11. The method of regulation according to claim 8, wherein in Step D when the air pressure value $P_3$ detected by the third pressure gauge satisfies $100<P_3<100$ Pa, the controller shields the received light temperature signal, and the sunshade film is insulated and inflated.

12. The method of regulation according to claim 8, wherein first pressure gauge is mounted on the gas storage tank, and the first pressure gauge is connected to the input end of the controller via a signal line, and
- when the pressure value of the first pressure gauge is equal to the maximum working air pressure value of the gas storage tank, the controller stops operation of the first air compressor; and
- when the pressure value of the first pressure gauge is equal to the minimum working air pressure value of the gas storage tank, the controller signals the first air compressor to operate.

\* \* \* \* \*